No. 715,335. Patented Dec. 9, 1902.
G. E. ALPHIN.
COMBINED FUMIGATOR AND REFRIGERATOR.
(Application filed Sept. 23, 1902.)
(No Model.) 2 Sheets—Sheet 1.
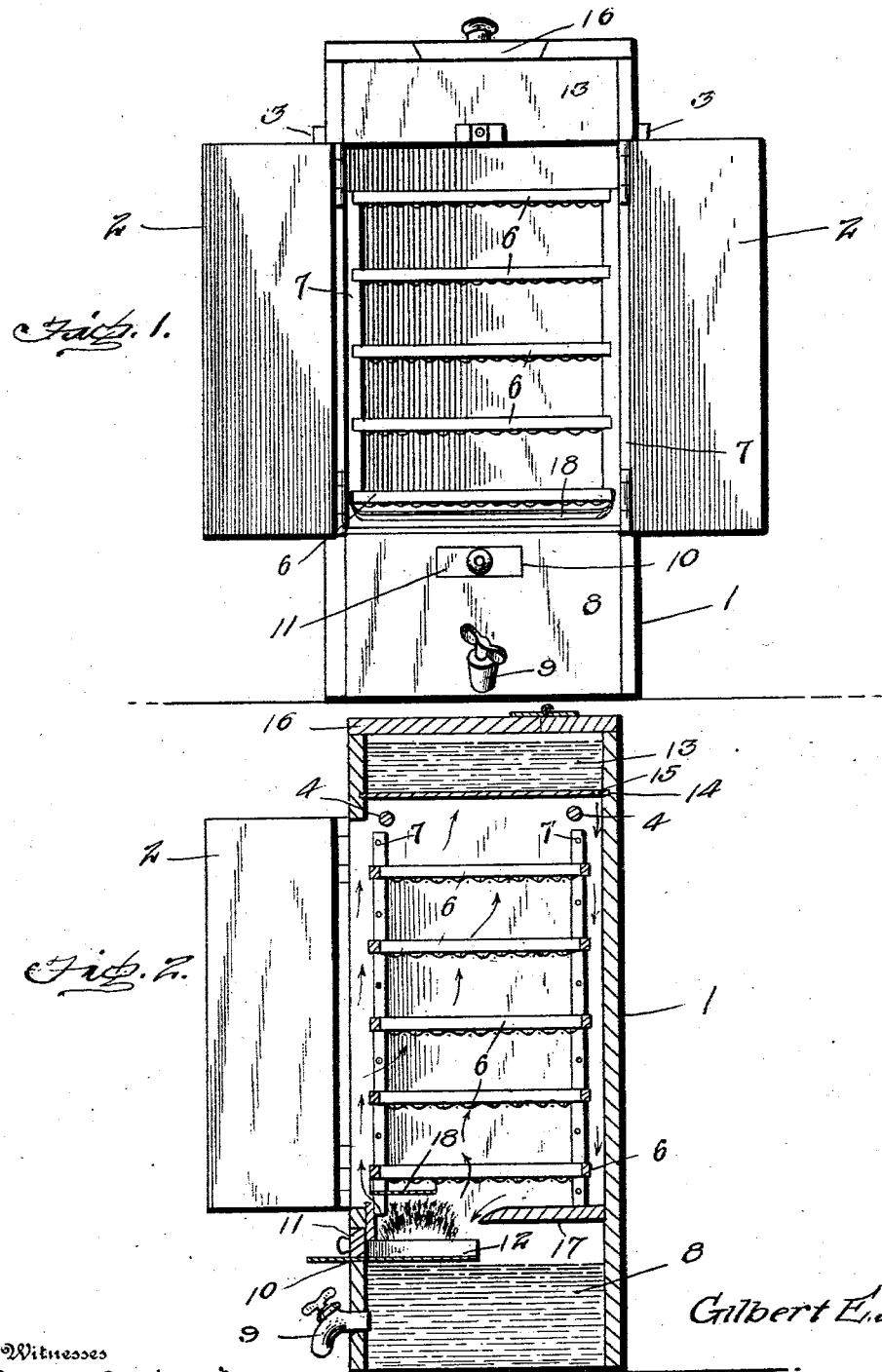
Inventor
Gilbert E. Alphin No. 715,335. Patented Dec. 9, 1902.
G. E. ALPHIN.
COMBINED FUMIGATOR AND REFRIGERATOR.
(Application filed Sept. 23, 1902.)
(No Model.) 2 Sheets—Sheet 2.
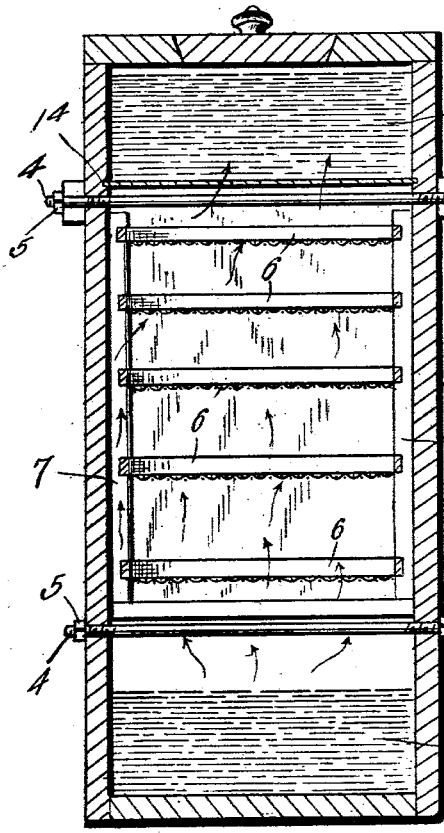
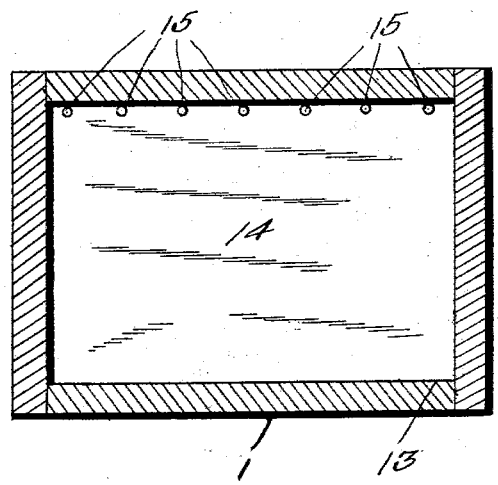
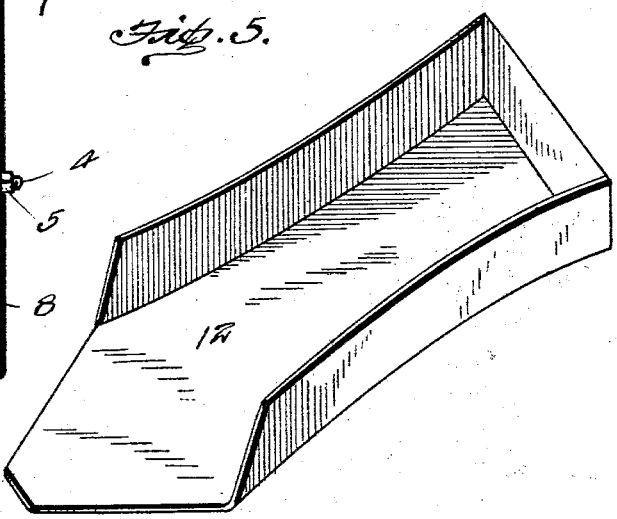
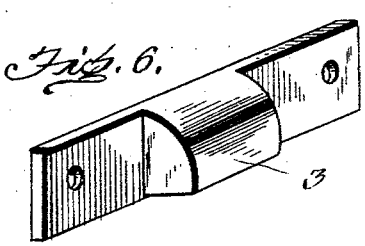
Inventor
Gilbert E. Alphin.
Witnesses
Jas. A. G. Koehl.
By H. B. Willson & Co.
Attorneys

UNITED STATES PATENT OFFICE.

GILBERT E. ALPHIN, OF MOUNT OLIVE, NORTH CAROLINA.

COMBINED FUMIGATOR AND REFRIGERATOR.

SPECIFICATION forming part of Letters Patent No. 715,335, dated December 9, 1902.

Application filed September 23, 1902. Serial No. 124,494. (No model.)

*To all whom it may concern:*

Be it known that I, GILBERT E. ALPHIN, a citizen of the United States, residing at Mount Olive, in the county of Wayne and State of North Carolina, have invented certain new and useful Improvements in a Combined Fumigator and Refrigerator; and I do declare the following to be a full, clear, and exact description of the invention, such as will enable others skilled in the art to which it appertains to make and use the same.

One object of my invention is to provide a simple, cheap, and effective apparatus for fumigating fruits, vegetables, milk, and other alimentary substances for the purposes of destroying noxious germs and preventing early deterioration or decay of the substance treated. Sulfur or other preferred chemical capable of emitting fumes is employed, and the latter are directed into contact with the articles to be treated and finally into contact with water, by which they are wholly or partly condensed and absorbed. The water thus impregnated is subsequently used for preserving the article which has been treated.

Another object of my invention is to provide an apparatus which will serve equally well as a refrigerator, thus making the apparatus available for two distinct and useful purposes.

The present invention embodies such improvements over the device shown in my prior patent, No. 678,212, dated July 9, 1901, as render the apparatus capable of these two uses.

The details of construction, arrangement, and operation are as hereinafter described and shown in the accompanying drawings, in which—

Figure 1 is a front elevation of the apparatus. Fig. 2 is a vertical front-to-rear section of the same, showing the fuming-pan applied. Fig. 3 is a vertical cross-section. Fig. 4 is a cross-section through the bottom of the upper ice or water compartment on line 4 4 of Fig. 2. Fig. 5 is a detail view of the fuming-pan. Fig. 6 is a perspective view of one of the handles.

The body or casing 1 of the receptacle for fruit or other substances to be fumigated or refrigerated is preferably rectangular and constructed of wood or other material and single or double walled, as desired. It is provided at front with a central door-opening adapted to be closed by outwardly-swinging hinged doors 2, and at the sides with handles 3, whereby it may be conveniently transported. These handles are secured upon the sides of the casing by tie-bolts 4 and their applied nuts 5, said bolts passing through the casing, whereby the adjustment of the nuts will enable the walls of the casing to be tightened up to make the joints vapor and water tight whenever required.

A series of pans or trays 6 are arranged one above the other in the receptacle 1 and provided with perforated bottoms to allow free passage of fumes. These trays are supported by suitably-notched vertical cleats or strips 7, and preferably formed each of a wooden frame with reticulated bottom; but they may be constructed and supported as in my aforesaid patent or in any other suitable manner. A surrounding space is left between the trays and walls of the receptacle for the free circulation of the fumes. The trays are inserted and removed through the doorway closed by the doors 2 and are adapted to support the fruit or other articles to be fumed or refrigerated.

The bottom of the receptacle 1 forms a water-compartment 8, in communication with which is a draw-off cock 9. The front wall of this compartment is formed with an opening 10, adapted to receive a stopper or plug 11 or a fuming-pan 12, accordingly as the apparatus is used as a refrigerator or fumigator. The top of the receptacle also forms a compartment 13, having a metallic bottom 14, provided adjacent to the rear wall of the receptacle with a row of openings 15. This compartment 13 is closed by a door 16 and is designed to serve as a water-compartment when the device is used as a fumigator and as an ice-compartment when the device is used as a refrigerator. The openings 15 are of comparatively small size to allow the water contained within the compartment 13 to drain slowly out and to pass down the rear wall of the receptacle into the base-compartment 8.

When the device is used as a refrigerator, the ice is placed in the compartment 13, and the opening 10 is closed by the stopper or plug 11, the articles to be kept cold or refrigerated being placed on the pans or trays 6. The air in the upper portion of the tray-chamber of the receptacle will be cooled by the ice in the compartment 13, and this cooled air will descend through the perforated bottoms of the trays and the space between the trays and the wall of the receptacle, while the water of condensation will drain through the openings 15 and pass down into the compartment 8, from whence it may be drawn off whenever desired through the draw-off cock 9. If desired, the device may also be made to serve as a water-cooler by placing the water to be cooled with the ice in the compartment 13 and allowing it to pass down in the manner described into the compartment 8 and drawn off whenever desired through the cock 9.

In using the apparatus as a fumigator the top chamber 13 is partly filled with water and the several pans or trays 6 with the fruit or other articles to be treated. The chemical substance is then placed in the fuming-pan 12, the latter inserted in the opening 10, and the chemical substance ignited. The doors 2 having been closed at the outset of this operation, the fumes from the ignited chemical substance are caused to pass up through the pan 6 in direct contact with the fruit and also around the sides of the pans and over the same, as indicated by arrows in Figs. 2 and 3, and then enter the water-holding compartment 13 through the openings 15, where the fumes are condensed and absorbed by the water. The latter escapes slowly through the openings 15 into the tray-compartment of the receptacle and trickles down the inner side of the rear wall thereof into the base-compartment 8. The water as it trickles down strikes upon a horizontal shelf 17, arranged below the lowermost pan 6, and thence falls into the compartment 8. In such fall from the shelf 17 the water passes in further contact with the fumes and is saturated with the chemical. This water is drawn off through the cock 9 and is saved for use in putting up the fruit, &c., in jars.

A shield-plate 18 is carried by the lower pan or tray 6 and is arranged immediately above the fuming-pan 12 and serves to prevent access of undue heat from the pan 12 to said pan 6. The said shield is separated from the bottom of the pan by a space which permits of the free passage of the fumes.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus described my invention, what I claim as new, and desire to secure by Letters Patent, is—

A fumigating apparatus, comprising a receptacle having top and bottom compartments and an intermediate chamber, the said chamber being in communication with said compartments and provided in its side with a doorway adapted to be sealed by a suitable closure, the bottom compartment also having an opening communicating with the exterior, a fuming-pan adapted to be inserted in said opening for the generation of fumes within the base-compartment, means for closing said opening upon the removal of the fuming-pan, and one or more holders superposed in the chamber and adapted to be inserted and removed through the said doorway, substantially as described.

In testimony whereof I have hereunto set my hand in presence of two subscribing witnesses.

GILBERT E. ALPHIN.

Witnesses:
J. G. MARTIN,
M. C. S. CHERRY.